United States Patent
Mann et al.

(10) Patent No.: US 8,566,468 B2
(45) Date of Patent: Oct. 22, 2013

(54) EXTENSIBLE DATA DRIVEN MESSAGE VALIDATION

(75) Inventors: Robert Alexander Mann, Carp (CA); Ajay Kirit Pandya, Ottawa (CA); Mike Vihtari, Kanata (CA)

(73) Assignee: Alcatel Lucent, Paris (FR)

( * ) Notice: Subject to any disclaimer, the term of this patent is extended or adjusted under 35 U.S.C. 154(b) by 751 days.

(21) Appl. No.: 12/778,251

(22) Filed: May 12, 2010

(65) Prior Publication Data
US 2011/0281554 A1 Nov. 17, 2011

(51) Int. Cl.
*G06F 15/16* (2006.01)
(52) U.S. Cl.
USPC .......................................................... 709/230
(58) Field of Classification Search
USPC .......................................................... 709/230
See application file for complete search history.

(56) References Cited

U.S. PATENT DOCUMENTS

| | | | | |
|---|---|---|---|---|
| 7,512,965 | B1 * | 3/2009 | Amdur et al. | 726/1 |
| 2005/0144463 | A1 * | 6/2005 | Rossebo et al. | 713/185 |
| 2006/0015724 | A1 * | 1/2006 | Naftali et al. | 713/168 |
| 2007/0005786 | A1 * | 1/2007 | Kumar et al. | 709/230 |
| 2011/0103374 | A1 * | 5/2011 | Lajoie et al. | 370/352 |
| 2011/0281554 | A1 * | 11/2011 | Mann et al. | 455/410 |
| 2011/0314043 | A1 * | 12/2011 | Bernstein et al. | 707/769 |
| 2012/0207086 | A1 * | 8/2012 | Vihtari et al. | 370/328 |
| 2012/0210006 | A1 * | 8/2012 | Vihtari | 709/227 |
| 2012/0233298 | A1 * | 9/2012 | Verbandt et al. | 709/220 |

OTHER PUBLICATIONS

CodeIgniter User Guide Version 1.7, "Form Validation", http://web.archive.org/web/20081230164912/http://codeigniter.com/user_guide/libraries/form_validation.html, published by the Wayback Machine on Dec. 3, 2008.*

* cited by examiner

*Primary Examiner* — Jerry Dennison
(74) *Attorney, Agent, or Firm* — Kramer & Amado P.C.

(57) ABSTRACT

Various exemplary embodiments relate to a method, network component and machine-readable storage medium for validating a message received at a network component. Embodiments may include one or more of the following: receiving a message at the network component, determining a validation scenario, determining a set of validation conditions associated with the determined validation scenario, and determining whether the message passes the validation condition. Various exemplary embodiments may further include extensible condition definitions that include one or more of the following: validation fragments, element validation definitions, and element definitions. Various exemplary embodiments may use XML to define condition definitions.

20 Claims, 6 Drawing Sheets

EXTENSIBLE DATA DRIVEN MESSAGE VALIDATION

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. As seen in second and third generation networks, voice services must be carried over dedicated voice channels and directed toward a circuit-switched core, while other services are transmitted via the Internet Protocol (IP) and directed to a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it calls Long Term Evolution (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212 provides guidance on the format of messages passed between the various components. 3GPP TS 29.212 specifies that the EPC components will communicate using the Diameter Protocol and Attribute Value Pairs (AVPs). The specifications further provide more specific definitions of protocols and messages over several interfaces within the EPC and definitions of individual AVPs.

The specifications allow a great deal of flexibility in constructing messages. For example, most message definitions in 3GPP TS 29.212 allow for the addition of extra undefined AVPs. Additionally, the Diameter Protocol allows messages to contain multiple AVPs without a specific order. Messages of different types may use the same AVP in different situations with different meanings. This degree of flexibility however creates problems of interoperability as component manufacturers implement the specification differently. Because of the flexibility, there is no overall valid message format that can be used to validate every message. Moreover, implementations have changed over time and legacy systems may use different message formats. This has resulted in generally weak validation to accommodate the degree of flexibility in message format.

In view of the foregoing, it would be desirable to provide a method to ensure interoperability between messages received at a network component. In particular, it would be desirable to provide message interoperability which maintains the flexibility of the specifications and allows for specific variations and modifications.

SUMMARY

In light of the present need for a method of ensuring interoperability between messages received at a network component, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of validating a message received at a network component, the method including one or more of the following: receiving a message at the network component; determining a validation scenario from a set of validation scenarios; determining a set of validation conditions associated with the determined validation scenario; for each validation condition of the set of validation conditions: determining whether the message passes the validation condition, and if the message does not pass the validation condition, determining that the message is invalid; and if the message passes each validation condition, determining that the message is valid. Various exemplary embodiments may relate to the above method encoded on a machine-readable storage medium as instructions for a network component to validate received messages.

Scenarios may represent a particular type of message to be processed. Scenarios may be defined broadly or specifically for interoperability with a particular network component. Determining a validation scenario may include matching an interface via which the network component received the message with a scenario interface, matching a command element of the message with a scenario command, or evaluating criteria conditions of the scenario definition. Criteria conditions and validation conditions may have configurable and extensible definitions. Condition definitions may include validation fragments that are reusable partial definitions. Condition definitions may also include element validation definitions that define one or more validation types that may be performed on a message element. Message elements may be defined generally or specifically for a particular network component.

Various exemplary embodiments relate to a network component for validating a message received at the network component, the network component including one or more of the following: a scenario definition storage that contains validation scenario definitions for validating various types of received messages, at least one validation scenario definition comprising at least one validation condition; a scenario selector that selects an applicable scenario definition from the scenario definition storage based on the received message; a condition validator that performs at least one validation on the received message to test a validation condition; and a scenario validator that determines, according to the scenario definition, at least one validation condition that the condition validator must test for the message to be valid. The network component may also include a message history, validation fragment storage and one or more network interfaces.

It should be apparent that, in this manner, various exemplary embodiments enable interoperable message validation. In particular, by using validation scenarios and extensible condition definitions, the method provides strong validation by performing specific validations on message elements. The method also provides interoperability by allowing scenario specific condition definitions that may be configured for different types of messages and network components.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
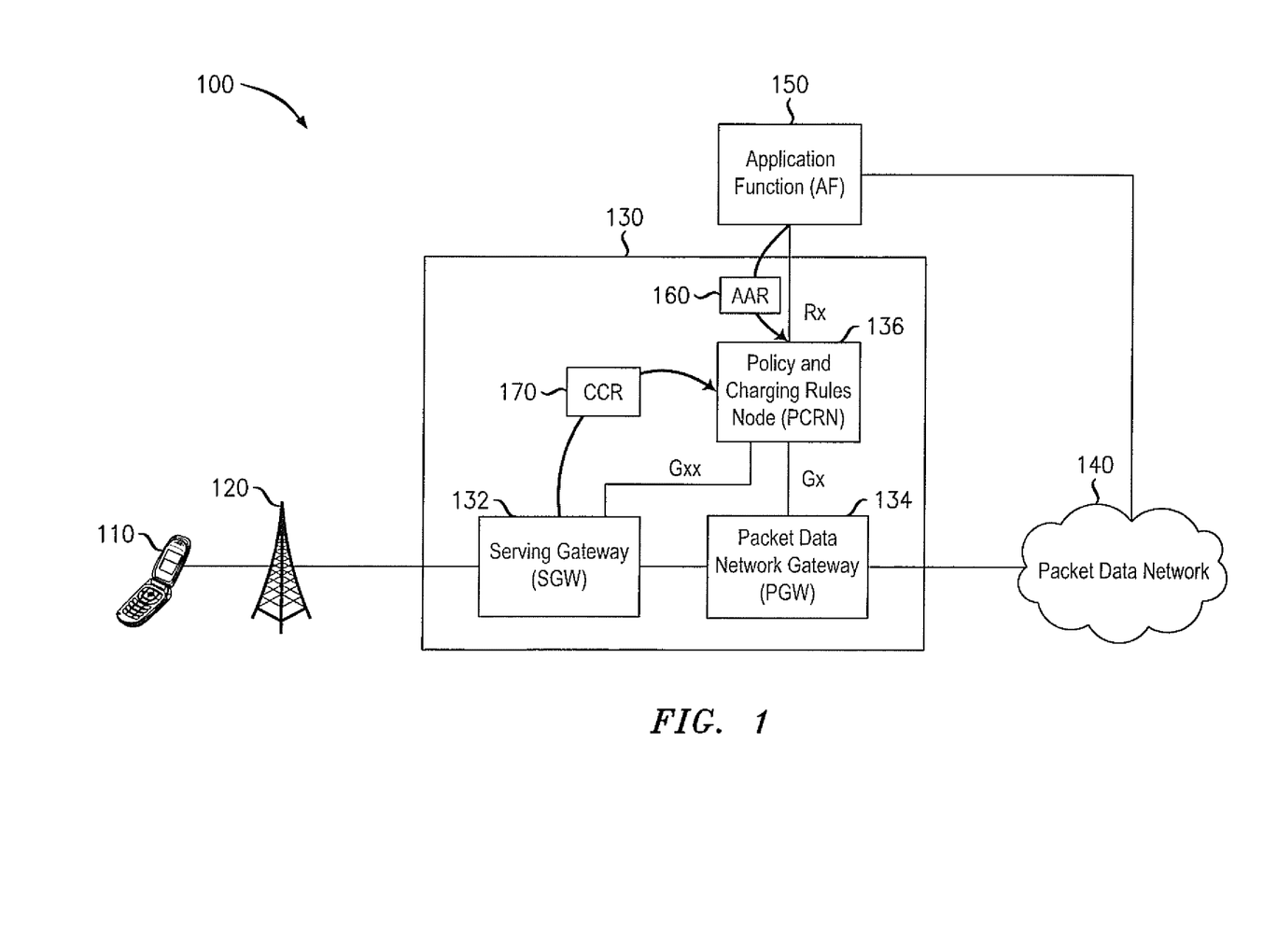
FIG. 1 illustrates an exemplary subscriber network for providing various data services.

FIG. 1 illustrates an exemplary subscriber network 100 for providing various data services. Exemplary subscriber network 100 may be a telecommunications network or other network for providing access to various services. Exemplary network may include user equipment 110, base station 120, evolved packet core (EPC) 130, packet data network 140, and application function (AF) 150. Although the exemplary network shown conforms to 3GPP specifications for an LTE network, a person of ordinary skill in the art should recognize that the disclosed methods and network components may be applicable to validation of messages in other network configurations.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, smart phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, and a policy and charging rules node (PCRN).

Serving gateway (SGW) 132 may be a device that manages data paths between the base station 120 and PGW 134. The data paths may contain virtual containers called bearers with unique Quality of Service (QoS) characteristics. The bearers may contain virtual connections called service data flows (SDFs). In various embodiments where user equipment 110 is a mobile device and base station 120 is an eNodeB, SGW 132 may be responsible for establishing new bearers when the mobile device changes eNodeB. The SGW 132 may implement a bearer binding and event reporting function (BBERF) according to the 3GPP TS 29.212, 29.213, and 29.214 standards. In various embodiments, EPC 130 may include multiple serving gateways.

The SGW 132 may also provide various messages to the PCRN 136 via the Gxx interface in the form of a credit control request (CCR) message 170. In various embodiments including multiple SGWs, each serving gateway may construct messages differently. For example, one SGW may send an event message with an Event-Trigger AVP and the relevant content elements, while another SGW may send only the relevant content elements.

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may request new PCC rules from PCRN 136 by sending a CCR message via the Gxx interface. PGW 134 may also include a number of additional features such as, for example, packet filtering, deep packet inspection, and subscriber charging support.

The PGW 134 may also provide a variety of messages to the PCRN via the Gx interface in the form of CCR messages (not shown). PGW 134 may construct messages using the same format as SGW 132 or a different format than SGW 132. For example, PGW 134 may send an event message with an Event-Trigger AVP and the relevant content elements, whereas SGW 132 may send only the relevant content elements or vice versa. PGW 134 may also arrange elements of messages in a different order than SGW 132.

Policy and charging rules node (PCRN) 136 may be a device that receives requests for application services, generates PCC rules, and provides PCC rules to the PGW 134 and/or other PCENs (not shown). PCRN 136 may be in communication with AF 150 via an Rx interface. PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the Proxy Mobile IP (PMIP) standard for example, PCRN 136 may also generate QoS rules. Upon creating a new QoS rule or upon request by the SGW 132, PCRN 136 may provide QoS rules to SGW 132 via the Gxx interface using a command code answer (CCA) message.

Network messages sent from different network components such as, for example, SGW 132 and PGW 134 may have different formats for the same message type. Network components may also send different types of messages at different times. A network component such as, for example, PCRN 136 may receive numerous types of messages. It may also receive messages which are the same type, but are formatted differently. A message may include multiple message elements that provide information. For example, in the Diameter protocol, an attribute value pair (AVP) may be considered a message element. A validation scenario may describe a particular type and/or format for a message. Validation scenarios may be broad or narrow. For example, a broad validation scenario may apply to any AAR message. As another example, a narrow validation scenario may apply only to AAR messages for a particular service. PCRN 136 may validate each message by determining an applicable scenario for the message and analyzing the elements of the message according to the scenario. Finally, PCRN 136 may respond to the message appropriately according to the message type.

Packet data network 140 may be any network for providing data communications between user equipment 110 and other devices connected to packet data network 140, such as AF 150. Further, packet data network 140 may provide, for example, phone and/or Internet service to various user devices in communication with packet data network 140.

Application function (AF) 150 may be a device that provides an application service to user equipment 110. Thus, AF 150 may be a server or other device that provides, for example, streaming video service to user equipment 110. AF 150 may further be in communication with the PCRN 136 of the EPC 130 via an Rx interface. When AF 150 is to begin providing application service to user equipment 110, AF 150 may generate an application request message, such as an AA-Request (AAR) 160 according to the Diameter protocol, to notify the PCRN 136 that resources should be allocated for the application service. Such an application request message may include information such as an identification of the subscriber using the application service and an identification of the particular service data flows that must be established in order to provide the requested service. AF 150 may communicate such an application request to the PCRN via the Rx interface 215. In some embodiments there may be multiple AFs. Some AFs may include additional elements in the AAR. Each AF may format an AAR message differently.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-6.

A network component such as, for example, PCRN 136 may receive a message from any other network component, such as, for example, SGW 132, PGW 134 or AF 150. PCRN 136 may validate the received message by first determining an applicable validation scenario for the message based on, for example, the origin of the message and the message type. The origin of the message may include, for example, the network component that sent the message or the interface via which the PCRN 136 received the message. The type of message may include, for example, the command type. The PCRN 136 may also determine the scenario based on the elements of the message. For example, if a CCR message contains an Event-Trigger AVP, the PCRN 136 may determine that a different validation scenario is applicable to the event message than if the message did not contain the Event-Trigger AVP.

After the PCRN 136 determines a validation scenario, it may apply a set of validation conditions associated with the scenario to determine whether the message is valid. If the message passes each validation condition, the PCRN 136 may determine that the message is valid and continue processing the message. If the message fails a validation condition, the PCRN 136 may determine that the message is invalid and issue an error report.

Although the receipt of messages has been described in relation to PCRN 136 and EPC 130, it should be apparent to a person of ordinary skill in the art that PCRN 136 is an example of a network component. Any network component regardless of whether or not it is implemented in accordance with LTE may receive and validate messages according to the methods described herein.

Figure 2:
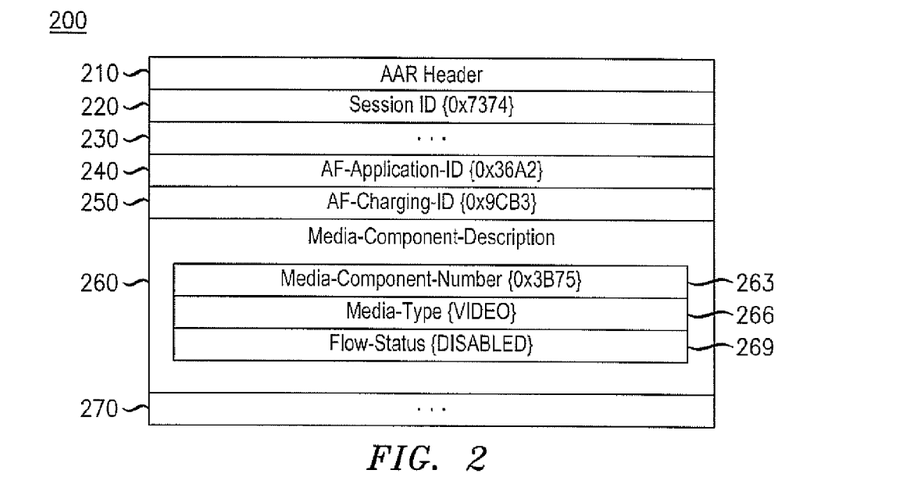
FIG. 2 illustrates an exemplary network message.

FIG. 2 illustrates an exemplary network message 200. Network message 200 may be an AAR message constructed according to the Diameter message protocol and/or 3GPP TS 29.214. Accordingly, network message 200 may include a header 210, Session-ID 220, AF-Application-ID 240, AF-Charging-ID 250, Media-Component-Description 260, and additional elements 220 and 270. Although exemplary network message 200 is shown as an AAR message, it should be understood that a network component such as, for example, PCRN 136, may receive other types of messages and that an AAR message is used as an example. Network components may also receive other types of Diameter messages or messages constructed according to other protocols such as, for example, RADIUS, TACACS or IP.

Header 210 may be a standard Diameter header indicating that message 200 is an AAR message. Thus, header 210 may include a command code field set to value 265 and the R-bit field of the command flags field set, as provided for by the Diameter protocol and 3GPP TS 29.214. Session-ID 220 may be located immediately after Header 210. Session-ID 220 may define the Diameter session associated with message 200. AF-Application-ID 240 may be an AVP for indicating the AF that originated the network message 200. It may also be used to identify a particular service associated with the AF. AF-Charging-ID 250 may be an AVP for correlating charging information with the bearer layer. Media-Component-Description 260 may be an AVP for indicating a requested service. Media-Component-Description 260 may contain Media-Component Number 263, Media-Type 266 and Flow-Status 269. Additional elements 220, 270 may be any number of additional information elements. For example, additional elements 220, 270 may include information for identifying the origin and destination network components of the message.

Figure 3:
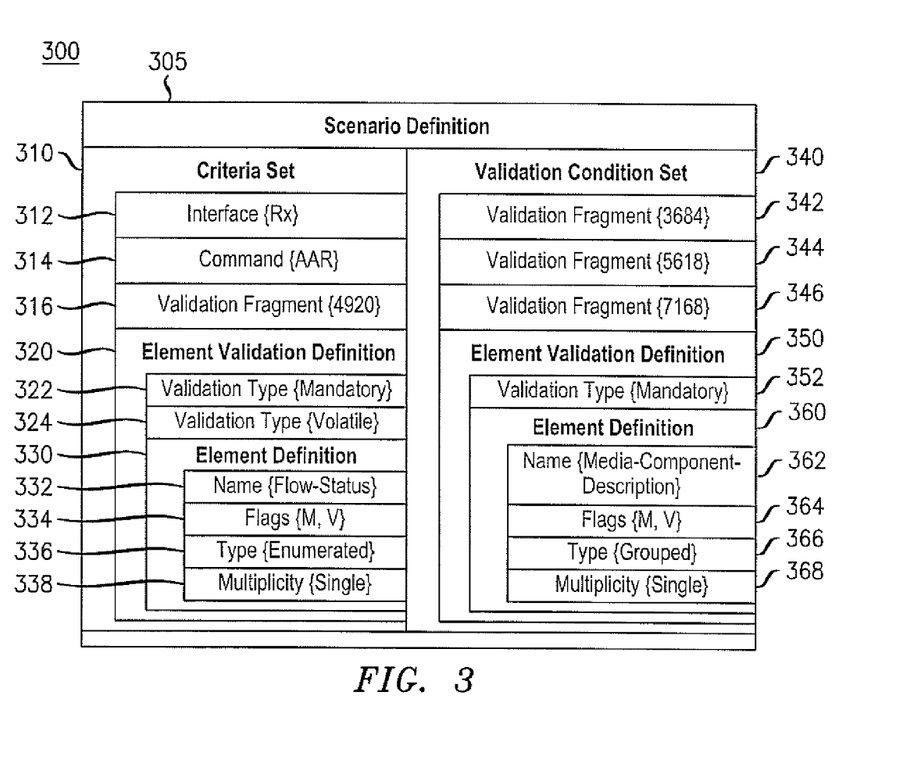
FIG. 3 illustrates an exemplary data arrangement for storing a scenario definition.

FIG. 3 illustrates an exemplary data arrangement 300 for storing a scenario definition. Data arrangement 300 may be, for example, an XML file stored in scenario definition storage 525. Alternatively, data arrangement 300 may be a series of linked lists, an array, or a similar data structure. The definitions may be edited to modify, add, or delete validation fragments. Other languages may also be used to define and store validation fragments. Thus, it should be apparent that data arrangement 300 is an abstraction of the underlying data; any data structure suitable for storage of this data may be used.

As an example of an entry in data arrangement 300, scenario definition 305 may define a scenario for receiving AAR update messages at the PCRN 126 from an AF 150. Scenario definition 305 may include criteria set 310 and validation condition set 340. Scenario criteria 310 may include requirements that a message must satisfy for the scenario to apply such as, for example, interface 312, command 314, validation fragment 316, and element validation definition 320. Interface 312 may indicate a required interface via which network component 500 received the message being validated. In this example, interface 312 may require the message to arrive via the Rx interface 515. Command 314 may indicate a required command element of the message. In this example, command 314 may indicate that the message must be an AAR message. Alternatively, command 314 may contain the command flag "265" for an AAR message. Scenario definition 305 may also include criteria conditions such as element validation definitions and validation fragments. Validation fragment 316 may indicate one or more required criteria conditions. As will be described in further detail with FIGS. 4-5, validation fragment 316 may be a reference to a validation fragment defined elsewhere, such as, for example, validation fragment storage 540.

Element validation definition 320 may define a criteria condition for the scenario definition to apply. As will be described in greater detail with regard to FIG. 5, element validation definition 320 may contain one or more validation types such as, for example, validation type 322 and validation type 324, and an element definition 330. Validation type 322 and 324 may indicate validations that condition validator 535 may perform on a message element defined by element definition 330. In this example, validation type 322, may indicate that condition validator 535 should perform a "mandatory" validation on a flow-status message element. In this example, validation type 324, may indicate that condition validator 535 should perform a "volatile" validation on a flow-status message element. This validation may require the flow-status message element of the message currently being validated to be different from the flow-status message element of the previously received message within the same session.

Element definition 330 may define a message element. Message elements may be generally defined or defined specifically for a message element as used by a particular network component. Element definition 320 may contain information such as, for example, name 332, flags 334, type 336 and multiplicity 338. Name 332 may be a name or other identifier for the message element such as, for example, the name of an AVP or an AVP identification code. Flags 334 may indicate various qualities of the message element such as, for example, the M flag may indicate that the message element must be defined for every network component, and the V flag may indicate that the network component uses a vendor specific definition for the message element. Type 336 may indicate the type of data stored in the message element. For example, type 336 indicates that the Flow-Status AVP stores an OctetString data type. Other data types may include, for example, Enumerated, Grouped and Unsigned32. Multiplicity 338 may indicate whether the message element contains a single value or multiple values.

Validation condition set 340 may indicate a set of conditions that a message, for which scenario definition 305 applies, must pass for the message to be valid. Validation condition set 340 may include validation fragments and element validation definitions. For example, validation condition set 340 includes validation fragments 342, 344, 366 and element validation definition 350. Similar to validation fragment 316, validation fragments 342, 344 and 366 may be references to a validation fragment defined elsewhere, such as validation fragment storage 540. Validation fragments will be described in greater detail below with reference to FIGS. 4-5.

Element validation definition 350 may define a validation condition that a message must pass to be valid. Element validation definition 350 may contain one or more validation types such as, for example, validation type 352 and an element definition 360. Validation type 352 may indicate validations that condition validator 535 may perform on a message element defined by element definition 330. In this example, validation type 322 may indicate that condition validator 535 should perform a "mandatory" validation on a media-component description message element. Similar to element definition 320, element definition 360 may define a message element. Element definition 360 may contain information such as, for example, name 362, flags 364, type 366 and multiplicity 368. For example, the information contained in element definition 360 may describe a Media-Component-Description AVP, with the M and V flags set, a grouped type value and single multiplicity.

Figure 4:
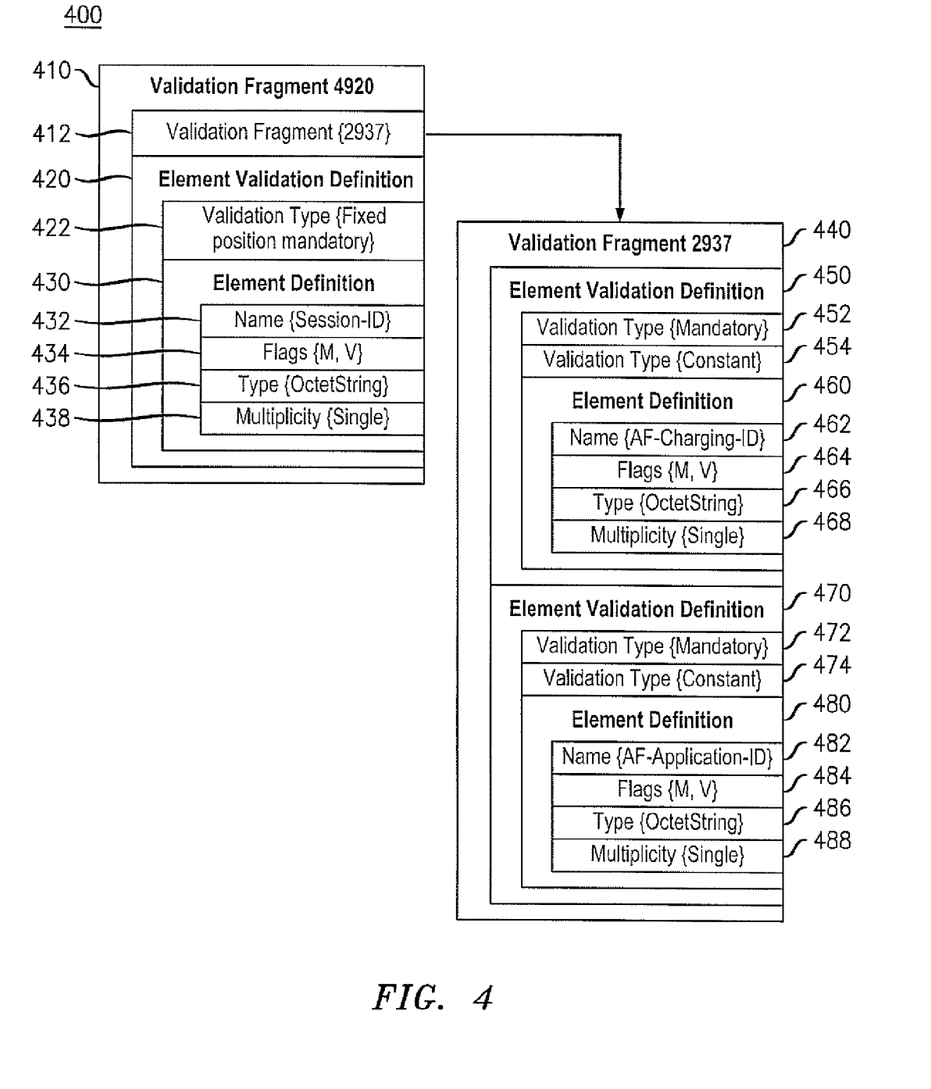
FIG. 4 illustrates an exemplary data arrangement for storing validation fragments.

FIG. 4 illustrates an exemplary data arrangement 400 for storing validation fragments. Data arrangement 400 may be, for example, an XML file stored in validation fragment storage 540. Alternatively, data arrangement 400 may be a series of linked lists, an array, or a similar data structure. The definitions may be edited to modify, add, or delete validation fragments. Other languages may also be used to define and store validation fragments. Thus, it should be apparent that data arrangement 400 is an abstraction of the underlying data; any data structure suitable for storage of this data may be used.

Validation fragment 410 may be referenced by one or more criteria sets, validation condition sets, and/or another validation fragments. Validation fragments may define a condition that may be used by multiple scenarios or conditions. For example, validation fragment 410 may define several required elements of an AAR message. Validation fragment 410 may include validation fragment reference 412 and element validation definition 420. Validation fragment reference 412 may point to another validation fragment such as, for example, validation fragment 440. Alternatively, validation fragment reference 412 may use a validation fragment ID to reference validation fragment 440. Element validation definition 420 may be similar to element validation definitions 320 and 350.

Element validation definition 420 may define a validation condition that a message must pass to be valid. Element validation definition 420 may contain one or more validation types such as, for example, validation type 422 and an element definition 430. Validation type 422 may indicate validations that condition validator 535 may perform on a message element defined by element definition 430. In this example, validation type 422, may indicate that condition validator 535 should perform a "fixed position mandatory" validation on a session-ID message element. Element definition 430 may define a message element. Element definition 430 may contain information such as, for example, name 432, flags 434, type 436 and multiplicity 438. For example, the information contained in element definition 430 may describe a Session-ID AVP, with the M and V flags set, an OctetString type and single multiplicity.

Validation fragment 440 may be a part of a validation definition that is often re-used. For example, validation fragment 440 may be used to validate a set of message elements that commonly occur together. Validation fragment 440 may include element validation definitions 450 and 470. Alternatively, element validation definitions 450 and 470 may be validation fragments defined elsewhere.

Element validation definition 450 may describe a particular validation to be performed on a message element. Element validation definition 450 may include one or more validation types. For example, element validation definition 450 includes validation type 452 and validation type 454. These validation types indicate respectively that "mandatory" and "constant" validations should be performed. Element definition 460 may describe various properties of an element. For example, element definition 460 includes element name 462, flags 464, type 466, and multiplicity 468. Element name 452 indicates that the name of the element is "AF-Charging-ID." Flags 464 indicate that support for the element is required and that a vendor-ID is included in the header of the element. Type 466 indicates that the value of the element is an octet string. Multiplicity 468 indicates that the element has a single value.

Element validation definition 470 may describe a particular validation to be performed on a message element. Element validation definition 470 may include one or more validation types and an element definition. For example, element validation definition 470 includes validation type 472, validation type 474 and element definition 480. Validation types 472 and 474 indicate respectively that "mandatory" and "constant" validations should be performed. Element definition 480 may describe various properties of an element. For example, element definition 480 includes element name 482, flags 484, type 486, and multiplicity 488. Element name 482 indicates that the name of the element is "AF-Application-ID." Flags 484 indicate that support for the element is required and that a vendor-ID is included in the header of the element. Type 486 indicates that the value of the element is an octet string. Multiplicity 488 indicates that the element has a single value.

Figure 5:
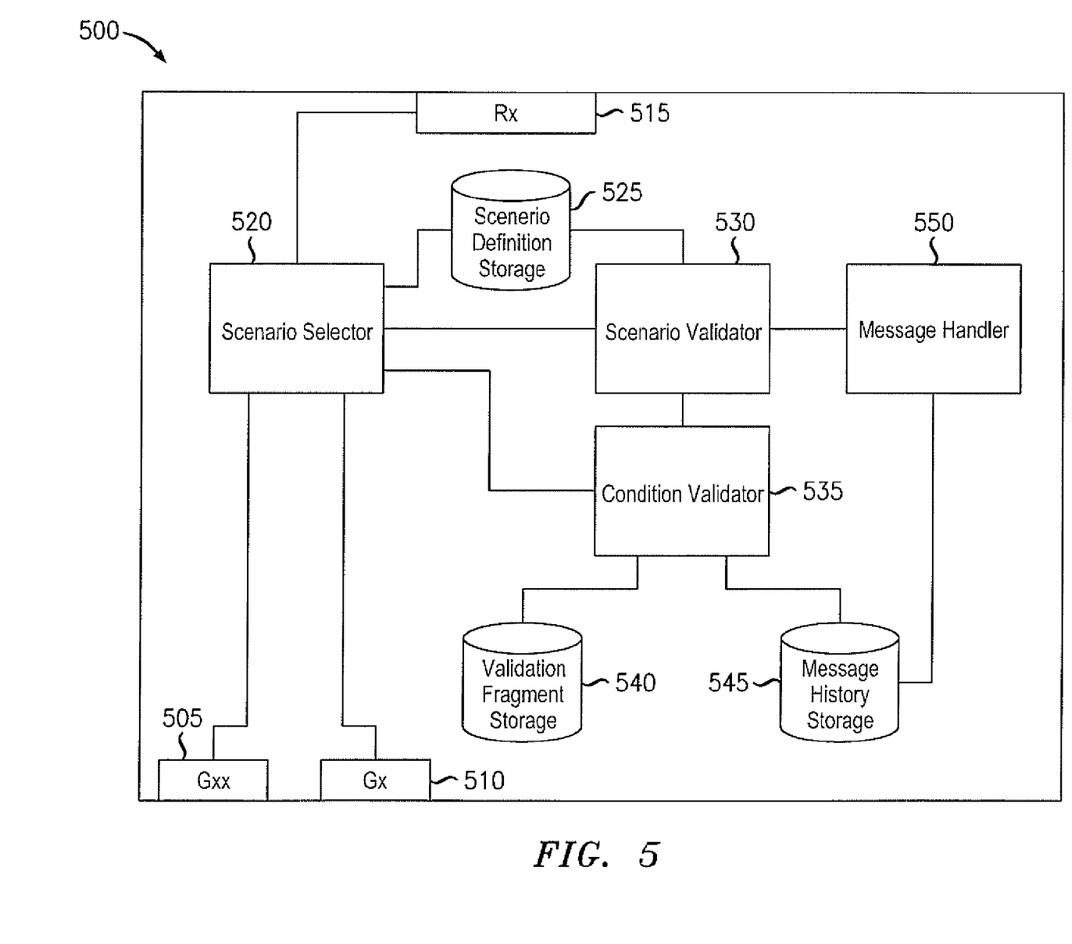
FIG. 5 illustrates an exemplary network component for receiving and validating messages from other network components.

FIG. 5 illustrates an exemplary network component 500 for receiving and validating messages from other network components. Network component 500 may correspond to PCRN 136. However, it should be understood that network component 500 is an example and features of the invention may be embodied in other network components. Network component 500 may include Gxx interface 505, Gx interface 510, Rx interface 515, scenario selector 520, scenario definition storage 525, condition validator 535, element definition storage 540, message history storage 545, scenario validator 530 and message handler 550.

Gxx interface 505 may be an interface comprising hardware and/or executable instructions encoded on a machine-readable storage medium configured to communicate with an SGW such as SGW 132. Such communication may be implemented according to the 3GPP TS 29.212. For example, Gxx interface 505 may receive event messages and application requests from SGW 132 and send QoS rules to SGW 132. Gxx interface 505 may receive messages from SGW 132 that deviate from the format specified by 3GPP TS 29.212.

Gx interface 510 may be an interface comprising hardware and/or executable instructions encoded on a machine-readable storage medium configured to communicate with a PGW such as PGW 134. Such communication may be implemented according to the 3GPP TS 29.212. For example, Gx interface 510 may receive event messages and application requests from PGW 134 and send PCC rules to PGW 134. Gx interface 510 may receive messages from PGW 134 that deviate from the format specified by 3GPP TS 29.212.

Rx interface 515 may be an interface comprising hardware and/or executable instructions encoded on a machine-readable storage medium configured to communicate with an application function such as AF 150. Such communication may be implemented according to the 3GPP TS 29.214. For example, Rx interface 515 may receive authorization application request (AAR) messages from. AF 150.

Scenario selector 520 may include hardware and/or executable instructions encoded on a machine-readable storage medium configured to determine which validation scenario applies to a received message. Scenario selector 520 may receive messages from Gxx interface 505, Gx interface 510, Rx interface 515 or any other interface through which network component 500 receives messages. Scenario selector 520 may use scenario definitions stored in scenario definition storage 525 to determine which validation scenario applies to a received message by applying each scenario definition to the message and information in message history storage 545. Scenario selector 520 may determine which scenario applies by comparing interface 312 of a scenario definition with the interface via which network component 500 received the message. For example, if network component 500 receives a message via Rx interface 515, scenario selector 520 may determine that only scenario definitions listing Rx as the interface 312 apply. Furthermore, scenario selector 520 may determine which scenario applies by comparing a command 314 of a scenario definition with a command element of the message. For example, the command code field of a Diameter header may act as a command element. If the network component 500 receives a message with the command code field set to "265," scenario selector 520 may determine that the message is an AAR message and only scenario definitions listing "265" as the command element apply.

Scenario selector 520 may also determine which scenario applies using a set of criteria conditions indicated by the scenario definition. Criteria conditions may indicate a requirement that the message must satisfy for the scenario to apply to the message. For example, a criteria condition indicated by a scenario definition for an event message scenario may indicate that a message must contain an Event-Trigger AVP. Scenario selector 520 may use condition validator 535 to test whether a message satisfies each criteria condition of a scenario definition by passing the message and validation definition to condition validator 535. If a message passes each criteria condition, scenario selector 520 may determine that the scenario applies to the message. If the message fails a criteria condition, scenario selector 520 may determine that the scenario does not apply to the message and move on to the next scenario to repeat the process. Once scenario selector 520 has determined an applicable scenario, it may pass the message and applicable scenario to scenario validator 530.

Scenario definition storage 525 may be any machine-readable medium capable of storing data regarding scenario definitions. Accordingly, scenario definition storage 525 may include a machine-readable storage medium such as read-only memory (ROM), random-access memory (RAM), magnetic disk storage media, optical storage media, flash-memory devices, and/or similar storage media. Scenario definition storage 525 may store scenario definitions as an XML file or other data file, or as a table in a database. The definitions may be edited to modify, add, or delete scenarios. As described in greater detail with regards to FIG. 3 above, each scenario definition may define scenario criteria such as, for example, scenario interface, scenario command, and/or criteria conditions used to determine the appropriate scenario. Each scenario definition may further define a set of validation conditions used to determine whether the message is valid under the scenario. Criteria definitions may be similar in format and function to validation conditions, differing in the actions taken by network component 500 subsequent to a message passing or failing an evaluation.

Scenario validator 530 may include hardware and/or executable instructions encoded on a machine-readable storage medium configured to determine whether a message satisfies a certain scenario definition. Scenario validator 530 may load the scenario definition from scenario definition storage 525. Scenario validator 530 may then test each validation condition in the scenario definition. Scenario validator 530 may request that condition validator 535 test individual validation conditions by passing the message and validation condition to condition validator 535. In this manner, scenario validator 530 may use the same validation types and validation fragments as scenario selector 520, but may make a final determination as to the validity of the message. If scenario validator 530 determines that the message passes each validation condition in the scenario definition, it may determine that the message is valid. Scenario validator 530 may pass valid messages to message handler 550. If scenario validator 530 determines that a message is invalid, it may indicate a result code defined in the condition definition.

Condition validator 535 may include hardware and/or executable instructions encoded on a machine-readable storage medium configured to determine whether a message satisfies a certain criteria condition or validation condition. Condition validator 535 may determine whether a message satisfies a condition based on element validation definitions and/or validation fragments and/or messages stored in message storage 545. Condition validator 535 may determine which validations to perform by using element validation definitions stored in scenario definition storage 525 and/or validation fragment storage 540.

Condition validator 535 may perform validations according to a variety of validation types. Each validation type may be used in multiple different validation scenarios and validation conditions. Validation types may describe a required presence of a message element, a particular feature of a message element, a relationship between message elements and/or a relationship between a message element and a previous message element. For example, condition validator 535 may perform a "mandatory" validation type that requires an element to be present in the message for the message to be valid. As another example, condition validator 535 may perform a "mutual exclusion" validation type that forbids the presence of one or more elements if a certain element is present in the message. As a third example, condition validator 535 may perform a "range" validation type that requires the value of a message element to be within a range of values. As a fourth example, condition validator 535 may perform a "volatile" validation type that requires a message element to be different than a previous message element.

Condition validator 535 may perform numerous additional validation types including but not limited to: fixed position mandatory, forbidden, inclusive or, conditional mutual exclusion, dependence, conditional dependence, constraint, conditional restraint, constant, incremental, valid values and cardinality. Additionally, when a validation cannot be described with defined validation types, custom validations may be defined for individual scenarios using custom logic included in the scenario definition. Table 1, below, describes the requirements of various validation types:

TABLE 1

| Validation Type | Description |
|---|---|
| Fixed position mandatory | The message element must be present and in the position located. |
| Mandatory | The message element must be present. |
| Forbidden | The message element must not be present. |
| Inclusive OR | One of a set of message elements must be present. |
| Mutual exclusion | The presence of the message element forbids the existence of one or more other message elements. |
| Conditional mutual exclusion | The presence of the message element with a certain value forbids the existence of one or more other message elements. |
| Dependence | The presence of the message element requires the existence of one or more other message elements. |
| Conditional dependence | The presence of a message element with a certain value requires the existence of one or more other message elements. |
| Constraint | The presence of the message element constrains the valid values for another message element. |
| Conditional constraint | The presence of the message element with a certain value constrains the valid values of another message element. |
| Volatile | The value of the message element must have changed from the last time it appeared in a message. |
| Constant | The value of the message element must be the same in every message. |
| Incremental | The value of the message element must be greater than the last time it appeared in a message. |
| Range | The value of the message element must be in a specified range. |
| Valid values | The value of the message element must be in a set of provided values. |
| Cardinality | The multiplicity of the message element must be a specified number. |
| Custom | Defined by logic in the scenario definition |

Validation fragment storage 540 may be any machine-readable medium capable of storing validation fragments for evaluating messages. Accordingly, validation fragment storage 540 may include a machine-readable storage medium such as read-only memory (ROM), random-access memory (RAM), magnetic disk storage media, optical storage media, flash-memory devices, and/or similar storage media. Validation fragment storage 540 may store definitions of validation fragments as one or more XML files or other data files, or as a table in a database. The definitions may, therefore, be easily edited to modify, add, or delete validation fragments. Other languages may also be used to define and store validation fragments.

Message history 545 may be any machine-readable medium capable of storing previously received messages. Accordingly, message history storage 545 may include a machine-readable storage medium such as read-only memory (ROM), random-access memory (RAM), magnetic disk storage media, optical storage media, flash-memory devices, and/or similar storage media. Message history storage 545 may be used when a condition requires a comparison to previous messages. For example, condition validator 535 may compare a session ID of the current message with information in message history 545 to determine whether a session establishment scenario or a session update scenario applies.

Message handler 550 may include hardware and/or executable instructions encoded on a machine-readable storage medium configured to perform the functions of network component 500. Depending on the contents of the message, the message handler may change settings or update internal data of the network component 500. Message handler 550 may also update message history 545 with the valid message.

Figure 6A:
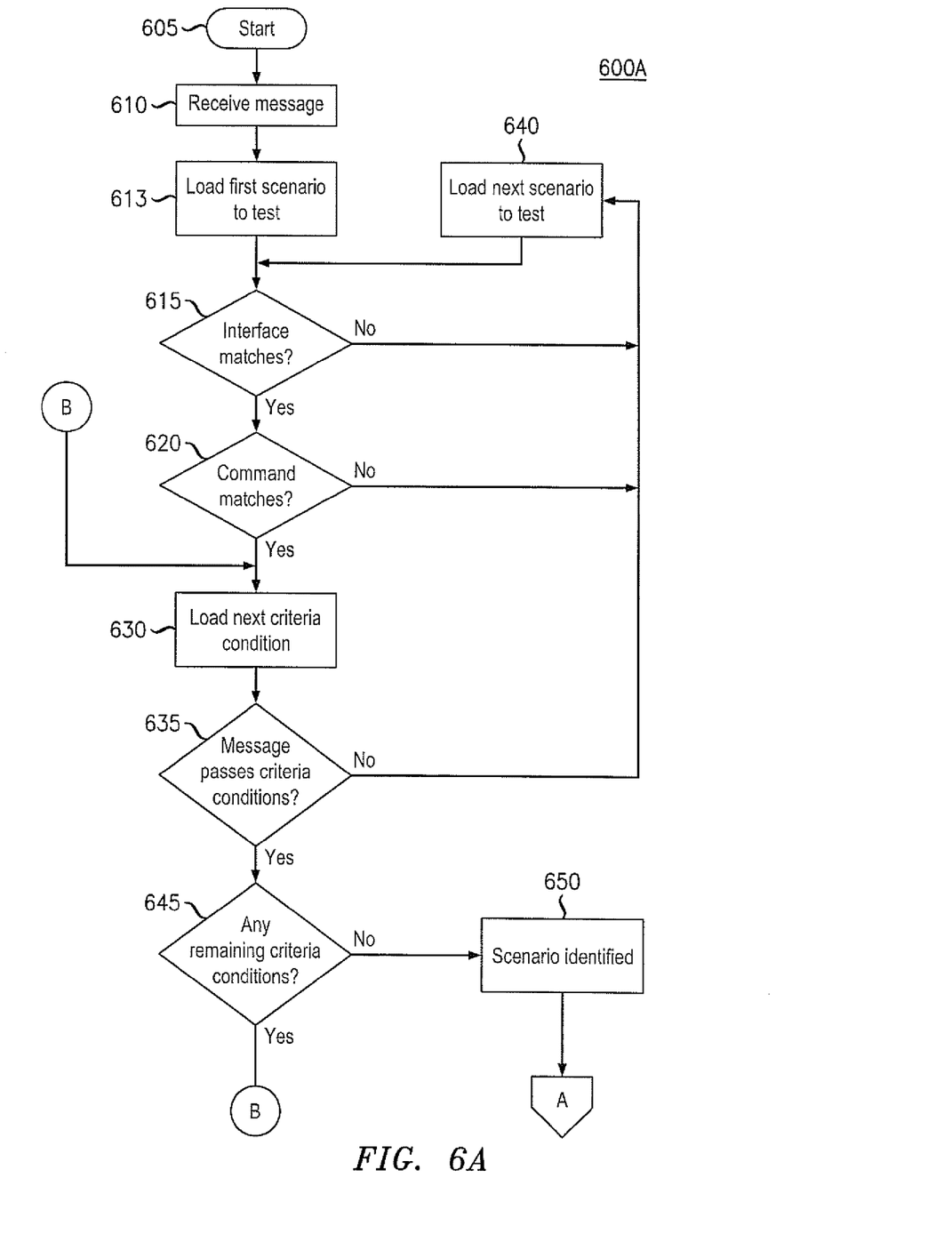
FIG. 6 illustrates an exemplary method for validating a received message.
Figure 6B:
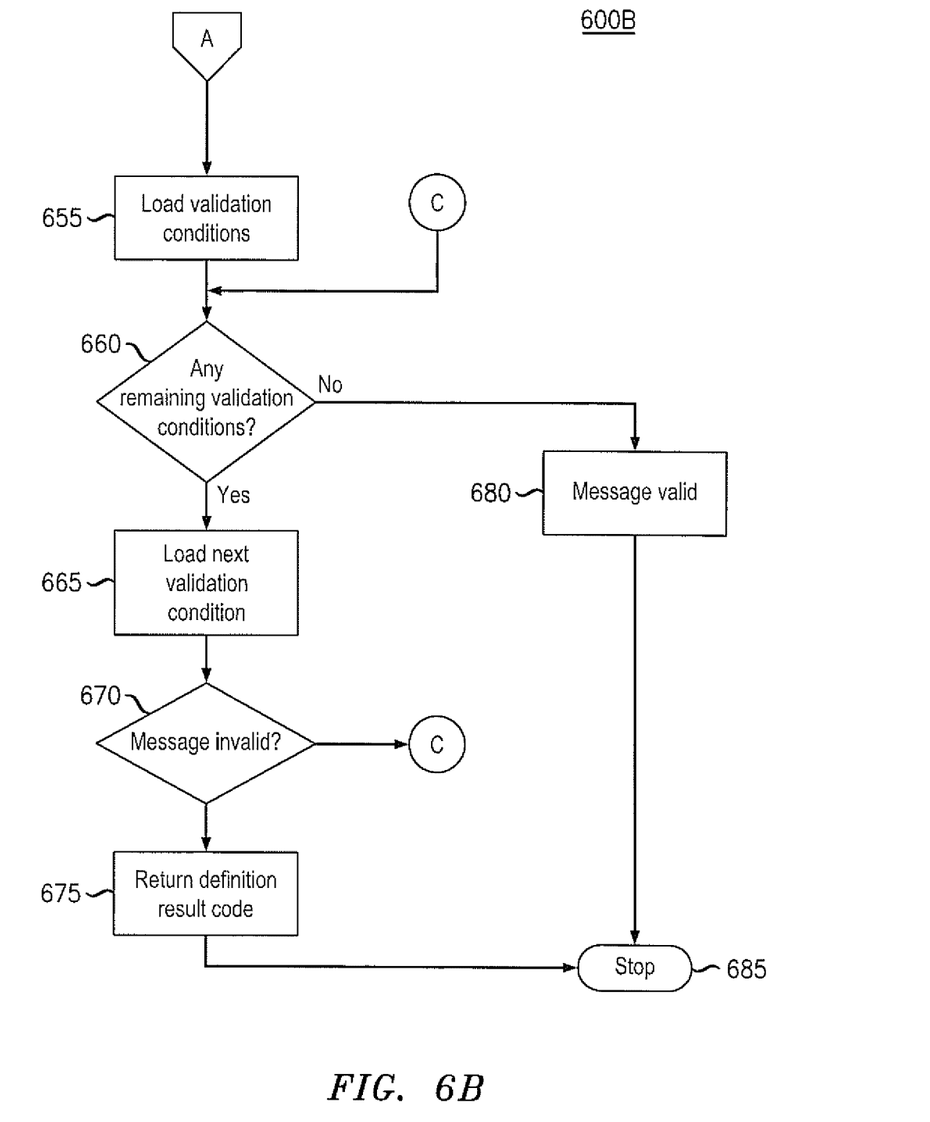

FIGS. 6a and 6b illustrate an exemplary method 600 for validating a received message. Method 600 may be performed by network component 500 to validate a variety of messages received from other network components.

Method 600 may begin at step 605 and proceed to step 610 where network component 500 may receive a network message via Gxx interface 505, Gx interface 510, Rx interface 515 or any other interface. For example, in the case of an AAR message, network component 500 may receive the message via Rx interface 515. Method 600 may then begin to determine an applicable scenario by proceeding to step 613 where scenario selector 520 loads the first scenario definition to test from scenario definition storage 525.

In step 615, scenario selector 520 may compare interface 312 of the scenario definition with the interface via which network component 500 received the message. If the interfaces match, method 600 may proceed to step 620. Otherwise, scenario selector 520 may determine that the loaded scenario does not apply to the message and proceed to step 640.

In step 620, scenario selector 520 may compare command 314 of the scenario definition with a command element of the received message. If the commands match, method 600 may proceed to step 625. Otherwise, scenario selector 520 may determine that the loaded scenario does not apply to the message and proceed to step 640.

In step 630, scenario selector 520 may test the applicability of a scenario definition by determining whether message 200 satisfies each criteria condition in criteria set 310. Scenario selector 520 may load each criteria condition from the loaded scenario definition. The method may then proceed to step 635 where the scenario selector 520 may use condition validator 535 to test each validation fragment and element validation definition in the criteria set 310. Condition validator 535 may determine which validations to perform according to the validation types listed in the condition definition and/or validation fragment. Condition validator 535 may then apply the validation type to the message and the element definition. If the message fails the criteria condition, network component 500 may determine that the current scenario is not applicable. The method may then proceed to step 640. If the method passes the criteria condition, the method may proceed to step 645.

In step 640, scenario selector 520 loads the next scenario to test. If there are no remaining scenarios in scenario definition storage 525, there may be no applicable scenario, and the message may be invalid. After scenario selector 520 loads the scenario definition, the method may return to step 615 and begin testing whether the scenario applies to the message.

In step 645, scenario selector 520 may determine whether there are any untested criteria conditions remaining in the scenario. If scenario selector 520 determines that there are remaining criteria conditions, the method may return to step 630, where scenario selector 520 may test the next criteria condition. If scenario selector 520 determines that there are no remaining criteria conditions in the scenario definition, then scenario selector 520 may determine that the loaded scenario is applicable to the message. The method may then proceed to step 650. Alternatively, in various embodiments, the method may validate multiple scenarios. In these embodiments, the method may return to step 640 and determine whether multiple scenarios are applicable.

In step 650, scenario selector 520 may determine the applicable scenario and pass the message and applicable scenario to scenario validator 530. The method may then proceed to step 655 where scenario validator 530 may load a validation condition set from the scenario definition in scenario definition storage 525. The method may then proceed to step 660.

In step 660, scenario validator 530 may determine whether there are any remaining validation conditions to test. If there untested validation conditions, the method may proceed to step 665, where scenario validator 530 may load the next validation condition from the scenario definition. If there are no untested validation conditions, the method may proceed to step 680.

In step 670, the scenario validator 530 may use condition validator 535 to test a criteria condition. Condition validator 535 may determine which validations to perform according to the element validation definition and/or validation fragment. If the condition uses a validation fragment, condition validator 535 may look up the validation fragment in validation fragment storage 540. Condition validator 535 may then apply the element validation definition to the message to determine whether the message passes the validation condition. If the message fails the validation condition, the method may proceed to step 675, where the method 600 may return a result code. The result code may be a generic failure code or may be specially defined for a particular scenario or condition. The method may then proceed to step 685, where the method may end. If the method passes the validation condition, the method may return to step 660 where scenario validator 530 may determine whether there are more validation conditions to test.

In step 680, the scenario validator 530 may determine that the message is valid. It may then pass the message to message handler 550. Message handler 550 may perform various message processing functions of the network component such as, for example, managing network resources, creating PCC rules, delivering content, etc. Message handler 550 may also add the valid message to message history 545. The method may then proceed to step 685 where the method may end.

Having described exemplary components and methods for the operation of exemplary subscriber network 100 and network component 500, an example of the operation of exemplary network 100 and network component 500 will now be provided with reference to FIGS. 1-6. PCRN 136 may correspond to network component 500. AAR 170 may correspond to network message 200. Data structure 300 may describe the contents of scenario definition storage 525. Data structure 400 may describe the contents of validation fragment storage 540.

The process may begin when network component 500 receives a message 200 from AF 150 via the Rx interface 515. Scenario selector 520 may begin validating message 200 by determining a scenario for the message. Scenario selector 520 may load the first scenario definition such as, for example, scenario definition 305, from scenario definition storage 525. Scenario selector 520 may then test scenario definition 305 to determine whether it applies to message 200.

Message 200 was received via the Rx interface 515, so scenario selector 520 may first compare interface 512 with Rx interface 515 and determine that the interfaces match. Message 200 is an AAR message as indicated by the AAR header 210, so scenario selector 520 may compare command 314 with AAR header 210 and determine that the commands match. If either the interface or the command does not match, scenario selector 520 may load the next scenario definition to test.

The scenario definition 310 for an AAR update message may contain criteria conditions such as, for example, validation fragment 316 and element validation definition 320. Scenario selector 520 may use condition validator 535 to test validation fragment 316 by first looking up the validation fragment in validation fragment storage 540. For example, validation fragment 316 contains a reference to a validation fragment ID with a value of "4920." Condition validator 535 may load validation fragment 410, which corresponds to this validation fragment ID. Because validation fragment 410 references validation fragment 412, condition validator 535 may look up validation fragment 440 in a similar manner.

Condition validator 535 may then test each element validation definition. For example, element validation definition 420 indicates that condition validator 535 may perform the "fixed position mandatory" validation on a Session-ID AVP. This validation may check that message 200 contains a Session-ID AVP immediately following the message header, which it does. As another example, element validation definition 450 may indicate that condition validator 535 may perform a "mandatory" validation type 452 on the AF-Charging-ID AVP. This validation may check that the message 200 contains an AF-Charging-ID AVP, which it does. As another example, condition validator 535 may perform a "constant" validation type 454 on the AF-Charging-ID AVP. This validation may check that the AF-Charging-ID AVP in message 200 is the same as an AF-Charging-ID AVP in a previously received message. Condition validator 535 may search message history 240 to determine whether such a previously received message is present. According to the element validation definition 470, condition validator 535 may perform the same validation types on the AF-Application-ID AVP. If message 200 fails any of these validations, scenario selector 520 may determine that the loaded scenario definition 305 does not apply.

Scenario selector 520 may also use condition validator 535 to determine whether message 200 passes element validation definition 320. Condition validator 535 may determine whether message 200 passes an element validation definition by performing each validation in the validation definition. For example, condition validator 535 may perform a "mandatory" validation type 322 on the Flow-Status AVP. This validation may check that the message 200 contains a Flow-Status AVP, which it does. As another example, condition validator 535 may perform a "volatile" validation type 324 on the Flow-Status AVP. This validation may check that the Flow-Status AVP in message 200 is different than the Flow-Status AVP in a previously received message. Condition validator 535 may search message history 540 for messages based on other message elements such as Session-ID 220, AF-Application-ID 240 and AF-Charging-ID 250 to determine whether such a previously received message is present. If message 200 passes each validation, scenario selector 520 may determine that scenario definition 305 is applicable to message 200. Otherwise, scenario selector 520 may test other scenario definitions to determine whether they are applicable.

The process may then proceed by scenario selector 220 passing the message 200 and scenario definition 305 to scenario validator 530. Scenario validator 530 may then load a validation condition set 340 from the scenario definition 305. Scenario validator 530 may use condition validator 535 to test each validation condition in a similar manner as used to test criteria conditions. For example, the scenario definition 310 for the AAR update scenario may contain an element validation definition 350 relating to the Media-Component-Description AVP 260. Element validation definition 350 indicates that scenario validator 530 may use condition validator 535 to perform a "mandatory" validation on message 200. Scenario definition 305 may also include validation fragments such as, for example, validation fragments 342, 344, and 346. These validation fragments may perform validations on, for example, Media-Component-Number AVP 263, Media-Type AVP 266 and Flow-Status AVP 269. Condition validator 535 may perform these validations similarly to the validation for validation fragment 316. Because the validations are specific to the AAR update scenario, the validations may require specific values or relationships to exist in message 200. If message 200 fails any condition, the process may return a result code defined in the condition definition. If message 200 passes every validation condition, network component 500 may determine that the message is valid.

Once the network component 500 determines that message 200 is valid, it may properly respond to the message. For example, if network component 500 is a PCRN, message handler 550 may respond to the AAR update message by issuing new PCC or QoS rules. Message handler 550 may also add message 200 to message history 545 so that it may be searched during future validations.

According to the foregoing, various exemplary embodiments provide for a method of strong and interoperable message validation. In particular, by using validation scenarios and extensible condition definitions, the method provides strong validation by performing specific validations on message elements. The method also provides interoperability by allowing scenario specific condition definitions that may be configured for different types of messages and network components. The method reduces need for custom validation logic because most validation can be described using defined validation types and validation fragments.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of validating a message received at a network component, the method comprising the steps of:
   receiving a message at the network component;
   selecting a validation scenario applicable to the message from a set of validation scenarios;
   determining a set of validation conditions associated with the determined validation scenario;
   for each validation condition of the set of validation conditions:
      determining whether the message passes the validation condition, and
      if the message does not pass the validation condition, determining that the message is invalid; and
   if the message passes each validation condition, determining that the message is valid,
   wherein the network component receives the message via an interface, each validation scenario in the set of validation scenarios is associated with a scenario definition, and the step of selecting a validation scenario from a set of validation scenarios comprises:
      matching a scenario interface of the scenario definition with the interface via which the network component received the message; and
      matching a command element of the scenario definition with a command element of the message.

2. The method of claim 1, wherein the scenario definition comprises a set of criteria conditions and the step of selecting a validation scenario further comprises:
   for each criteria condition determining whether the message passes the criteria condition, and
      if the message does not pass the criteria condition, determining that the validation scenario does not apply; and
   if the message passes each criteria condition, determining that the validation scenario applies.

3. The method of claim 1, wherein each validation condition comprises at least one of: a validation fragment and an element validation definition.

4. The method of claim 3, wherein a validation fragment comprises at least one of: a reference to another validation fragment and an element validation definition.

5. The method of claim 3, wherein an element validation definition describes one of: a required presence of a message element, a relationship to a different message element, and a value of a message element.

6. The method of claim 1, wherein a scenario definition is an XML file.

7. The method of claim 1, wherein the message is a diameter message, the interface is a diameter application, the command element is a diameter command, and at least one element validation definition is an AVP validation definition.

8. The method of claim 2, wherein each criteria condition comprises at least one of: a validation fragment and an element validation definition.

9. A network component for validating a received message, the network component comprising:
   a scenario definition storage that contains validation scenario definitions for validating various types of received messages, at least one validation scenario definition comprising at least one validation condition including a scenario interface and a scenario command element;
   a scenario selector that selects an applicable scenario definition from the scenario definition storage based on the received message by matching the scenario interface of the scenario definition with the interface via which the network component received the message; and matching the command element of the scenario definition with a command element of the message;
   a condition validator that performs at least one validation on the received message to test a validation condition; and
   a scenario validator that determines, according to the scenario definition, at least one validation condition that the condition validator must test for the message to be valid.

10. The network component of claim 9, further comprising a configurable validation fragment storage that contains validation fragments, wherein the condition validator determines whether the message satisfies a validation condition by determining whether the message satisfies a validation fragment.

11. The network component of claim 9, further comprising:
    a message history which stores data regarding previously received messages; and
    a message handler that processes at least one valid received message and updates the message history with the at least one valid received message,
    wherein the condition validator evaluates the received message for at least one validation condition according to data stored in the message history.

12. The network component of claim 9, further comprising a plurality of network interfaces that receive messages, wherein the scenario selector determines the applicable scenario definition for a message based on which interface received the message.

13. A non-transitory machine-readable storage medium encoded with instructions for a network component to validate a message received at the network component, the machine-readable storage medium comprising:
    instructions for receiving a message at the network component;
    instructions for selecting a validation scenario applicable to the message from a set of validation scenarios;
    instructions for determining a set of validation conditions associated with the determined validation scenario;
    for each validation condition of the set of validation conditions:
       instructions for determining whether the message passes the validation condition, and
       instructions for determining that the message is invalid if the message does not pass the validation condition; and
    instructions for determining that the message is valid if the message passes each validation condition,
    wherein the network component receives the message via an interface, each validation scenario in the set of validation scenarios is associated with a scenario definition, and the instructions for determining a validation scenario from a set of validation scenarios comprises:
       instructions for matching a scenario interface of the scenario definition with the interface via which the network component received the message; and
       instructions for matching a command element of the scenario definition with a command element of the message.

14. The non-transitory machine-readable storage medium of claim 13, wherein the scenario definition comprises a set of criteria conditions and the instructions for selecting a validation scenario further comprises:
    for each criteria condition,
        instructions for determining whether the message passes the criteria condition, and
            instructions for determining that the validation scenario does not apply if the message does not pass the criteria condition; and
    instructions for determining that the validation scenario applies if the message passes each criteria condition.

15. The non-transitory machine-readable storage medium of claim 13, wherein each validation condition comprises at least one of: a validation fragment and an element validation definition.

16. The non-transitory machine-readable storage medium of claim 15, wherein a validation fragment comprises at least one of: a reference to another validation fragment and an element validation definition.

17. The non-transitory machine-readable storage medium of claim 15, wherein an element validation definition describes one of: a required presence of a message element, a relationship to a different message element, and a value of a message element.

18. The non-transitory machine-readable storage medium of claim 15, wherein a scenario definition is an XML file.

19. The non-transitory machine-readable storage medium of claim 13, wherein the message is a diameter message, the interface is a diameter application, the command element is a diameter command, and at least one element validation definition is an AVP validation definition.

20. The non-transitory machine-readable storage medium of claim 14, wherein each criteria condition comprises at least one of: a validation fragment and an element validation definition.

\* \* \* \* \*